(12) United States Patent
Thompson et al.

(10) Patent No.: US 10,299,326 B2
(45) Date of Patent: May 21, 2019

(54) USB-POWERED UTILITY TOOL

(71) Applicant: 1842728 Ontario Inc, Barrie (CA)

(72) Inventors: Mitchell Thompson, Barrie (CA); David Snaith, Toronto (CA); Daniel Kowalewski, Woodbridge (CA); Steve A. Copeland, Barrie (CA)

(73) Assignee: 1842728 Ontario Inc, Barrie (CA)

( * ) Notice: Subject to any disclaimer, the term of this patent is extended or adjusted under 35 U.S.C. 154(b) by 0 days.

(21) Appl. No.: 15/882,500

(22) Filed: Jan. 29, 2018

(65) Prior Publication Data

US 2018/0302964 A1 Oct. 18, 2018

Related U.S. Application Data

(63) Continuation-in-part of application No. 15/485,313, filed on Apr. 12, 2017, now Pat. No. 10,041,639, which is a continuation-in-part of application No. 29/600,372, filed on Apr. 12, 2017, now Pat. No. Des. 835,306, which is a continuation-in-part of application No. 29/600,376, filed on Apr. 12, 2017,
(Continued)

(51) Int. Cl.
| | |
|---|---|
| *H05B 33/08* | (2006.01) |
| *F21V 23/06* | (2006.01) |
| *G06F 13/42* | (2006.01) |
| *F21V 15/01* | (2006.01) |
| *F21V 23/04* | (2006.01) |

(52) U.S. Cl.
CPC ......... *H05B 33/0824* (2013.01); *F21V 23/06* (2013.01); *G06F 13/4282* (2013.01); *H05B 33/0854* (2013.01); *F21V 15/01* (2013.01); *F21V 23/045* (2013.01); *F21V 23/0464* (2013.01); *F21V 23/0471* (2013.01); *G06F 2213/0042* (2013.01)

(58) Field of Classification Search
CPC .. F21Y 2115/10; F21Y 2103/33; F21V 33/00; F21V 33/0048; F21V 23/06; F21V 23/005; F21V 23/0407; F21S 6/003; F21S 8/035; F21S 10/00; F21W 2121/00; F21W 2131/30; F21W 2131/3005; F21K 9/20; G06F 13/4282; G06F 2213/0042; H05B 33/0824; H05B 33/0854
See application file for complete search history.

(56) References Cited

U.S. PATENT DOCUMENTS

| | | |
|---|---|---|
| D352,564 S | 11/1994 | Marischen |
| D375,808 S | 11/1996 | Fang |
| | (Continued) | |

*Primary Examiner* — Vibol Tan
(74) *Attorney, Agent, or Firm* — Sand, Sebolt & Wernow Co., LPA

(57) ABSTRACT

A universal serial bus (USB)-powered utility tool includes a housing defining an interior space, at least one dimmable light source positioned on one side of the housing and a USB connector extending outwardly from the housing. The USB connector may be positioned on another side of the housing. The USB connector may be positioned orthogonal to the at least one dimmable light source. The USB-powered utility tool may further include a printed circuit board (PCB) positioned orthogonal to the USB connector. The USB-powered utility tool may further include a processor logic configured to control a current being supplied to the at least one dimmable light source. The at least one dimmable light source may be controlled manually or via wireless communication.

20 Claims, 12 Drawing Sheets

Related U.S. Application Data now Pat. No. Des. 835,307, which is a continuation-in-part of application No. 29/600,378, filed on Apr. 12, 2017, now Pat. No. Des. 810,970.

(56) References Cited

U.S. PATENT DOCUMENTS

| | | |
|---|---|---|
| D376,436 S | 12/1996 | Emmerling |
| D377,535 S | 1/1997 | Shulman |
| 5,662,408 A | 9/1997 | Marischen |
| D392,756 S | 3/1998 | Hanig et al. |
| D393,733 S | 4/1998 | Gaskins et al. |
| D403,442 S | 12/1998 | Joss |
| D426,657 S | 6/2000 | Joss |
| D435,124 S | 12/2000 | Yuen |
| 6,644,834 B2 | 11/2003 | Christen |
| 6,894,343 B2 | 5/2005 | Harari et al. |
| 6,905,231 B2 | 6/2005 | Dickie |
| 6,955,448 B1 | 10/2005 | Lefferson |
| D533,956 S | 12/2006 | Vladika |
| D544,618 S | 6/2007 | Coushaine |
| D556,938 S | 12/2007 | Russello et al. |
| 7,303,327 B2 | 12/2007 | Copeland et al. |
| D562,492 S | 2/2008 | Chen |
| D574,095 S | 7/2008 | Hill et al. |
| D606,185 S | 12/2009 | Wefler et al. |
| D628,722 S | 12/2010 | Yamamoto et al. |
| D634,055 S | 3/2011 | Hokazono et al. |
| D647,227 S | 10/2011 | Kaule et al. |
| D736,449 S | 8/2015 | Getty |
| D741,539 S | 10/2015 | Gettings et al. |
| 9,408,282 B1 | 8/2016 | Springer |
| D771,860 S | 11/2016 | Weiss et al. |
| D777,367 S | 1/2017 | Ma |
| D779,977 S | 2/2017 | Jacob et al. |
| 9,568,171 B1 * | 2/2017 | Grider ............... F21V 21/0965 |
| 9,633,557 B2 | 4/2017 | Dimberg et al. |
| D794,765 S | 8/2017 | Brandenburg et al. |
| 9,759,421 B1 | 9/2017 | Baschnagel |
| 2002/0014960 A1 * | 2/2002 | Williams, Jr. ......... G06F 3/0202 340/500 |
| 2003/0193795 A1 * | 10/2003 | Brown ................... F21S 8/00 362/84 |
| 2004/0145890 A1 * | 7/2004 | Liao ..................... F21L 4/08 362/183 |
| 2007/0253192 A1 | 11/2007 | Monteiro et al. |
| 2008/0123332 A1 | 5/2008 | Searfoss |
| 2009/0073694 A1 | 3/2009 | Scannell, Jr. |
| 2012/0009807 A1 | 1/2012 | Kuo |
| 2014/0016331 A1 * | 1/2014 | Ting ..................... F21V 33/0052 362/382 |
| 2014/0316581 A1 | 10/2014 | Fadell et al. |
| 2015/0249336 A1 | 9/2015 | Raneri |
| 2015/0371534 A1 | 12/2015 | Dimberg et al. |
| 2016/0025316 A1 * | 1/2016 | Chien .................. F21V 23/023 362/253 |
| 2016/0173746 A1 | 6/2016 | Chien |
| 2016/0181726 A1 | 6/2016 | Zhang |
| 2016/0313636 A1 | 10/2016 | Chien |
| 2017/0193814 A1 | 7/2017 | Dimberg et al. |
| 2017/0205058 A1 * | 7/2017 | Ostrander .......... F21V 21/0885 |

* cited by examiner

000
USB-POWERED UTILITY TOOL

CROSS-REFERENCE TO RELATED APPLICATIONS

This application is a continuation in part of U.S. patent application Ser. No. 15/485,313, filed on Apr. 12, 2017; the disclosure of which is incorporated herein by reference.

This application is a continuation in part of U.S. patent application Ser. No. 29/600,372, filed on Apr. 12, 2017; the disclosure of which is incorporated herein by reference.

This application is a continuation in part of U.S. patent application Ser. No. 29/600,376, filed on Apr. 12, 2017; the disclosure of which is incorporated herein by reference.

This application is a continuation in part of U.S. patent application Ser. No. 29/600,378, filed on Apr. 12, 2017; the disclosure of which is incorporated herein by reference.

BACKGROUND OF THE INVENTION

Technical Field

The present disclosure relates generally to the field of universal serial bus (USB)-powered devices. More particularly, the present disclosure relates to a USB-powered utility tool. Specifically, the present disclosure relates to a USB-powered utility tool including a printed circuit board (PCB) and a USB connector mounted orthogonal to the PCB.

Background Information

Typically, universal serial bus (USB) interfaces are used to power and/or charge USB devices. Typically, USB-powered devices are connected to USB interfaces via USB connectors in order to receive power. One typical type of USB-powered device is a flash drive, which includes a housing enclosing a male USB connector that is mounted in parallel to a printed circuit board (PCB).

One of the issues that users find with USB-powered devices is that they tend to protrude an undesirable distance away from the USB interface. As a result, the USB-powered device takes up space which could be otherwise used. Further, because the USB-powered device protrudes an undesirable distance away from the USB interface, the USB-powered device may cause problems with objects and/or persons bumping into the USB-powered device.

SUMMARY

A need continues to exist for universal serial bus (USB)-powered devices. The device of the present disclosure addresses the shortcomings of previously known USB-powered devices.

In one aspect, the disclosure may provide a universal serial bus (USB)-powered utility tool comprising a housing defining an interior space, at least one dimmable light source positioned on one side of the housing and a USB connector extending outwardly from the housing. The USB connector may be positioned on another side of the housing. The USB connector may be positioned orthogonal to the at least one dimmable light source.

The USB-powered utility tool may further include a printed circuit board (PCB) positioned orthogonal to the USB connector. The PCB may include a first surface spaced apart from a second surface defining a longitudinal direction therebetween. The USB connector may be operationally engaged with the PCB and the USB connector may be mounted on the PCB orthogonal to the first surface of the PCB. The PCB may further include a through hole of the PCB extending through the first and second surface of the PCB. The USB connector may include a mounting portion extending through the through hole and fixedly connected to the first surface of the PCB.

The USB-powered utility tool may further include a central longitudinal axis extending between the first surface of the PCB and the second surface of the PCB and the USB connector may be positioned vertically upward from the central longitudinal axis. The PCB may further include a top edge and a bottom edge defining a vertical direction therebetween. The USB-powered utility tool may further include a central vertical axis extending between the top edge of the PCB and the bottom edge of the PCB and the USB connector may be positioned intermediate the central vertical axis.

The USB-powered utility tool may further include a processor logic configured to control a current being supplied to the at least one dimmable light source. The PCB and the processor logic may be configured to communicate wirelessly. The wireless communication may be adapted to be controlled by a user to control at least one of: an intensity of the at least one dimmable light source, a color of the at least one dimmable light source, an illumination timer for the at least one dimmable light source, a motion activator of the at least one dimmable light source and a notification mechanism for the at least one dimmable light source.

The at least one dimmable light source may include at least two light emitting diodes (LEDs) individually controllable by the processor logic.

The USB-powered utility tool may further include a front cover of the housing, a rear surface of the housing, a USB connector opening defined by the rear surface and a USB connector housing extending outwardly from the rear surface and in operable communication with the USB connector opening. The PCB may be mounted within the interior space of the housing. The USB connector may extend through the USB connector opening and may be at least partially enclosed by the USB connector housing. The front cover may be translucent and the at least one dimmable light source may be positioned to emit light through the front cover.

The housing may further include a front portion of the housing and a middle portion of the housing. The front portion and the middle portion may be translucent and the at least one dimmable light source may be positioned to emit light through the front portion and the middle portion.

The at least one dimmable light source may include at least one light-emitting diode (LED). The at least one light-emitting diode may be a red, green and blue light-emitting diode (RGB LED).

The USB connector may be a male USB connector adapted for electrically connecting to a USB receptacle to provide power to the USB-powered utility tool.

In another aspect, the disclosure may provide a method comprising providing a printed circuit board (PCB) having a first surface spaced apart from a second surface and mounting a USB connector to the PCB in an orientation orthogonal to the first surface of the PCB; wherein the USB connector is operationally engaged with the PCB. The method may further include operationally engaging at least one dimmable light source with the PCB and controlling a current supplied to the at least one dimmable light source using a processor logic.

In accordance with one aspect, an embodiment of the present disclosure may provide a method of controlling a universal serial bus (USB)-powered utility tool comprising downloading an application to a wireless electronic device associated with a USB-powered utility tool having at least one dimmable light source; connecting the wireless electronic device to the utility tool; selecting a color of the at least one dimmable light source; selecting a light intensity level of the at least one dimmable light source; selecting a timer control function of the at least one dimmable light source; selecting a motion activated control function of the at least one dimmable light source; and selecting a notification function of the at least one dimmable light source.

In another aspect, the disclosure may provide a universal serial bus (USB)-powered utility tool including a printed circuit board (PCB) having a first surface spaced apart from a second surface and a USB connector operationally engaged with the PCB. The USB connector is mounted on the PCB orthogonal to the first surface of the PCB. The USB-powered utility tool further includes at least one dimmable light source operationally engaged with the PCB and a processor logic configured to control a current being supplied to the at least one dimmable light source. The at least one dimmable light source can be controlled manually or via wireless communication.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
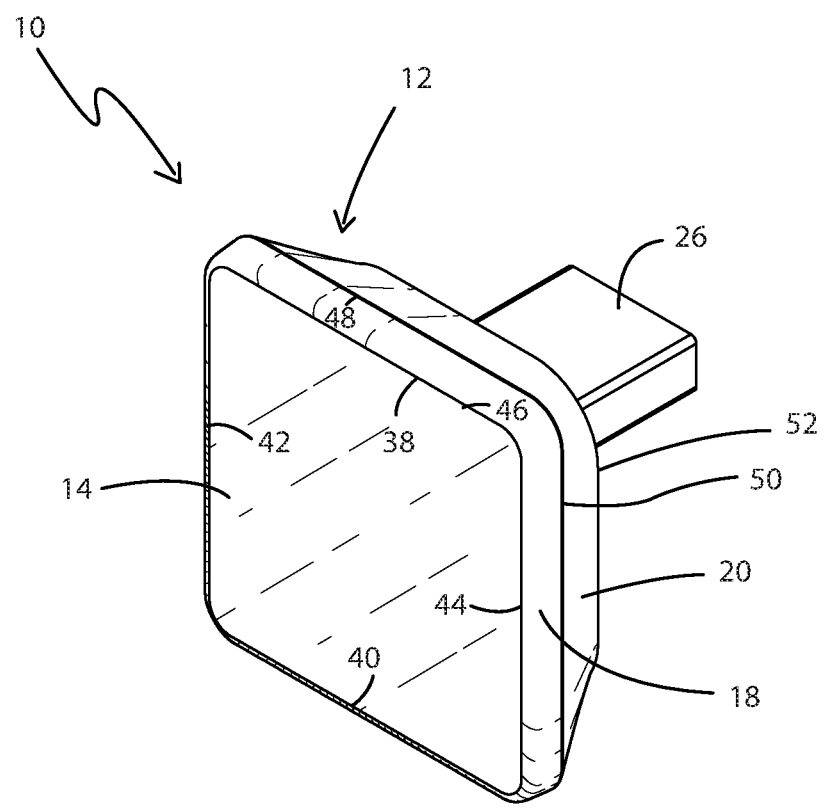
FIG. 1 is a front isometric view of a USB-powered utility tool in accordance with the present disclosure.

In accordance with one aspect of the present disclosure, a universal serial bus (USB)-powered utility tool is provided. As depicted FIG. 1, the utility tool is generally indicated by the reference number 10. FIG. 1 discloses a first exemplary embodiment of utility tool 10 as a night light.

As depicted in FIG. 1-FIG. 9, the night light 10 includes a housing 12 having a front cover 14, a rear surface 16 (FIG. 3), a front portion 18, a middle portion 20, a printed circuit board (PCB) 22 (FIG. 5), a USB connector 24 (FIG. 3), a USB connector housing 26, at least one dimmable light source 28 (FIG. 5), a wireless data communication module 30 (FIG. 5), such as a WiFi module, an antenna 32 (FIG. 5), a processor logic 34 (FIG. 5) and a power adapter 36 (FIG. 9) such as an alternating current (AC) power adapter. Although housing 12 has been depicted as having a front cover 14, a rear surface 16, a front portion 18 and a middle portion 20, housing 12 may have any suitable configuration as one of ordinary skill in the art would understand.

As depicted in FIG. 1-FIG. 4, and in accordance with one aspect of the present disclosure, the front cover 14 includes a top edge 38, a bottom edge 40, a left edge 42 and a right edge 44. The front cover 14 and the rear surface 16 of the night light 10 define a longitudinal direction therebetween, the left edge 42 and the right edge 44 of the front cover 14 define a transverse direction therebetween and the top edge 38 and the bottom edge 40 of the front cover 14 define a vertical direction therebetween.

Figure 2:
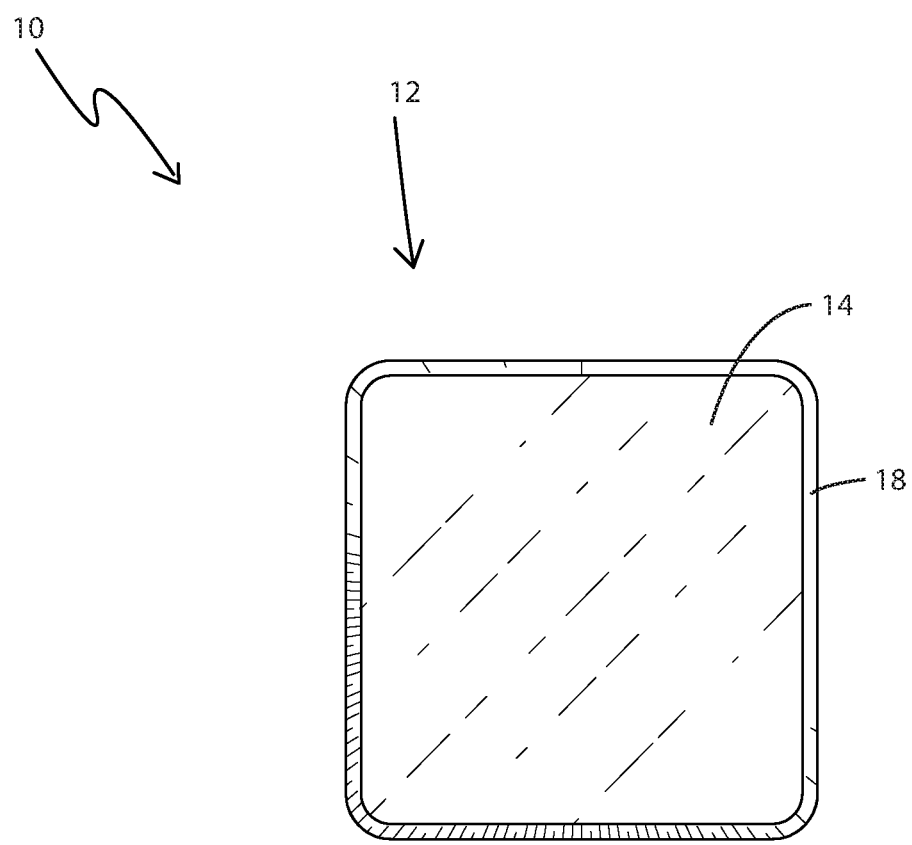
FIG. 2 is a front elevation view of the USB-powered utility tool in accordance with the present disclosure.

As depicted in FIG. 1 and FIG. 2, the front cover 14 may be a generally planar surface and may be generally rectangular in shape with rounded corners. Although the front cover 14 is depicted as having a generally planar surface, the front cover 14 may have a non-planar surface or any other suitable surface. Further, although the front cover 14 is depicted as being generally rectangular in shape with rounded corners, the front cover 14 may be any shape such as trapezoidal, circular or any other suitable shape.

In one example, the front cover 14 is made of a translucent acrylic/styrene material, although other suitable materials may be used as one of ordinary skill in the art would understand. Since the front cover 14 is translucent, when the night light 10 is powered on and the at least one dimmable light source 28 is illuminated, light shines out of the front cover 14 in a number of different directions. In another example, the front portion 18 and the middle portion 20 are made of a translucent acrylic/styrene material, although other suitable materials may be used as one of ordinary skill in the art would understand. Since the front portion 18 an the middle portion 20 are translucent, when the night light 10 is powered on and the at least one dimmable light source 28 is illuminated, light shines out of the front portion 18 and the middle portion 20 in a number of different directions, including, but not limited to, away from the rear surface 16 of the housing 12.

In accordance with one aspect of the present disclosure, the front portion 18 of utility tool 10 includes a first edge 46 spaced apart from a second edge 48 and the middle portion 20 includes a first edge 50 spaced apart from a second edge 52. The front cover 14 is fixedly secured to the first edge 46 of the front portion 18 in any suitable manner. The second edge 48 of the front portion 18 is fixedly secured to the first edge 50 of the middle portion 20 in any suitable manner. It will be understood that the front portion 18 and middle portion 20 may be integrally formed.

Figure 4:
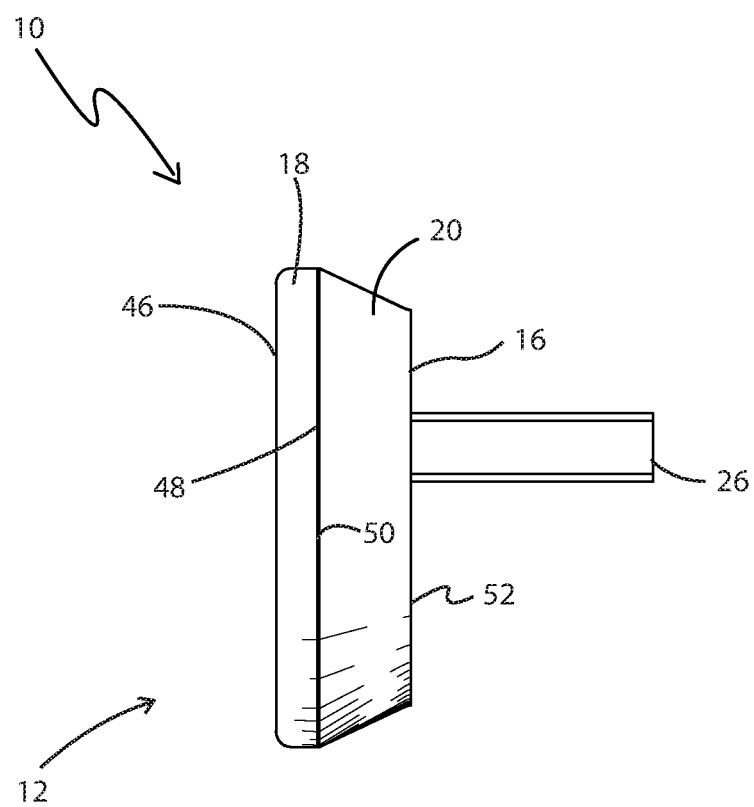
FIG. 4 is a right side elevation view of the USB-powered utility tool in accordance with the present disclosure.
Figure 5:
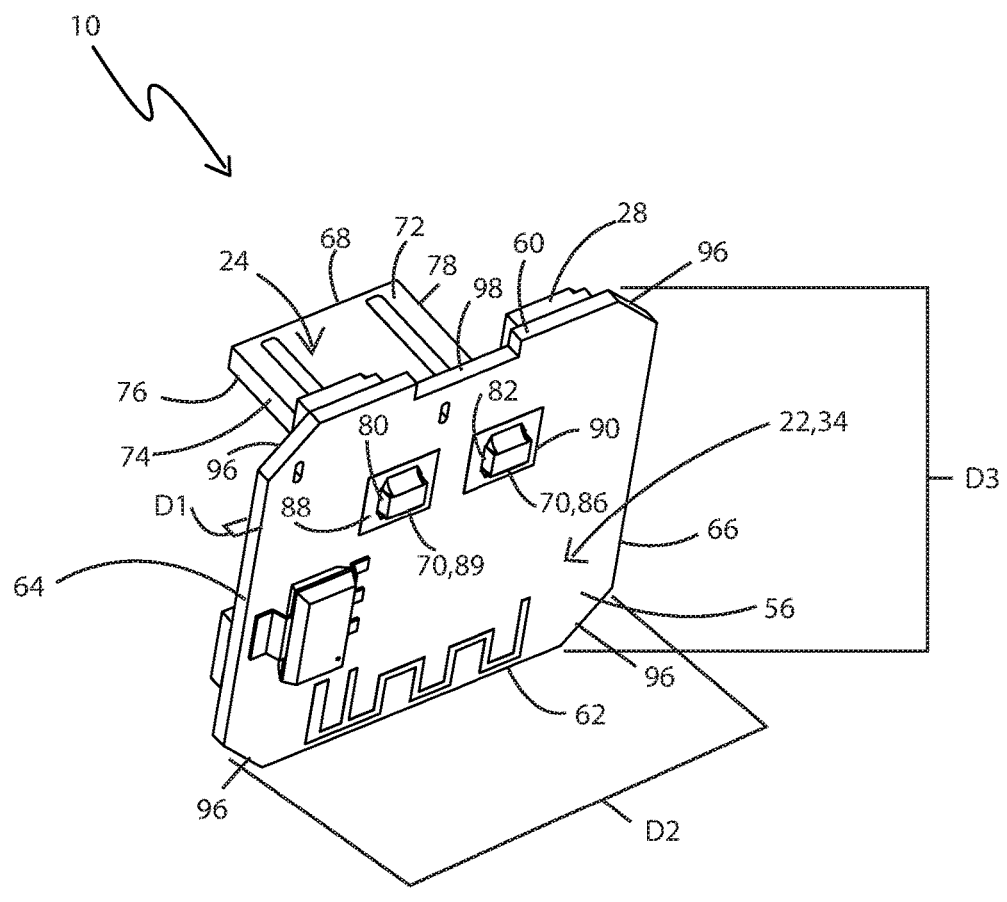
FIG. 5 is a front isometric view of a printed circuit board (PCB) in accordance with the present disclosure.

As depicted in FIG. 1 and FIG. 4, the front portion 18 extends longitudinally from the first edge 46 to the second edge 48. The front portion 18 may be generally rectangular in shape with rounded corners and may be beveled. Further, although the front portion 18 is depicted as being generally rectangular in shape with rounded corners and beveled in profile, the front portion 18 may be any other desired shape such as trapezoidal, circular, square or an irregular shape.

As depicted in FIG. 1 and FIG. 4, and in one example, the middle portion 20 extends longitudinally rearwardly from the first edge 50 to the second edge 52. The middle portion 20 further includes a peripheral wall that tapers rearwardly, i.e., towards second edge 52. Middle portion 20 may also be generally trapezoidal in shape with rounded corners although it will be understood that middle portion 20 may be configured to have any desired shape such as a rectangular, circular, square or irregular shape.

Figure 3:
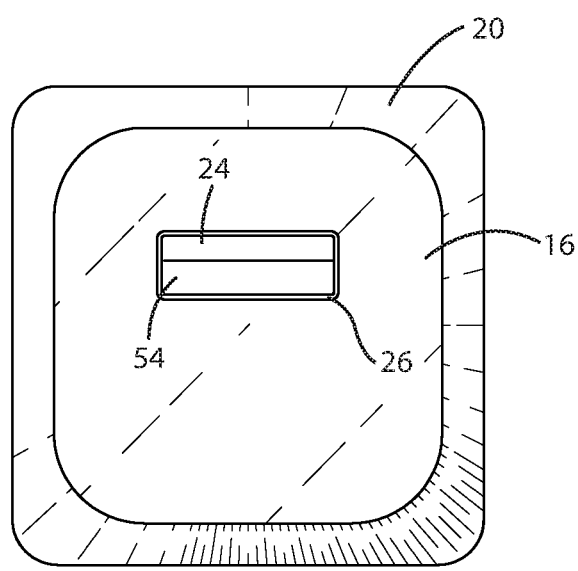
FIG. 3 is a rear elevation view of the USB-powered utility tool in accordance with the present disclosure.

As depicted in FIG. 3 and FIG. 4, the second edge 52 of the middle portion 20 may be fixedly secured to the rear surface 16 of the night light 10 in any suitable manner. The rear surface 16 may have a generally planar surface and is generally rectangular in shape with rounded corners. Although the rear surface 16 is depicted as having a generally planar surface and being generally rectangular in shape with rounded corners, the rear surface 16 may have a non-planar surface or any other suitable surface and may be any shape such as trapezoidal, circular or any other suitable shape.

As depicted in FIG. 3, the rear surface 16 defines a USB connector opening 54 sized so that the USB connector 24 may extend through the USB connector opening 54 as further described below. In one example, the USB connector opening 54 is generally rectangular in shape; however, the USB connector opening 54 may be any suitable size and/or shape that is complementary to the USB connector 24.

As depicted in FIG. 3 and FIG. 4, the USB connector housing 26 extends rearwardly from rear surface 16 and is integral with or is fixedly secured to the rear surface 16 in any suitable manner. Further, the USB connector housing 26 is in operable communication with the USB connector opening 54 and is sized to receive the USB connector 24 as further described below. The USB connector 24 extends through the USB connector opening 54 and is at least partially enclosed by the USB connector housing 26.

USB connector housing 26 defines an interior cavity within which PCB 22 is received. PCB 22 is shown in FIG. 5-FIG. 8 as comprising a planar member that has a first surface 56, a second surface 58, a top edge 60, a bottom edge 62, a left edge 64 and a right edge 66. For reference purposes, the first surface 56 of the PCB 22 is facing the same direction as the front cover 14 of the night light 10. The first surface 56 is spaced longitudinally from the second surface 58, the top edge 60 is spaced vertically from the bottom edge 62 and the left edge 64 is spaced transversely from the right edge 66. Further, the PCB 22 mechanically supports and electrically connects various electronic components as further described below. The PCB 22 includes circuitry configured to receive power from the USB receptacle and deliver that power to the various electronic components.

In one example, the first surface 56 is spaced a distance D1 from the second surface 58. The distance D1 may be any suitable distance. The PCB 22 includes a longitudinal axis X1 extending longitudinally from the first surface 56 to the second surface 58 through the center of the PCB 22. The left edge 64 is spaced a distance D2 from the right edge 66. The distance D2 may be any suitable distance. The PCB 22 includes a transverse axis X2 extending transversely from the left edge 64 to the right edge 66 through the center of the PCB 22. The top edge 60 is spaced a distance D3 from the bottom edge 62. The PCB 22 includes a vertical axis X3 extending vertically from the top edge 60 to the bottom edge 62 through the center of the PCB 22.

Figure 6:
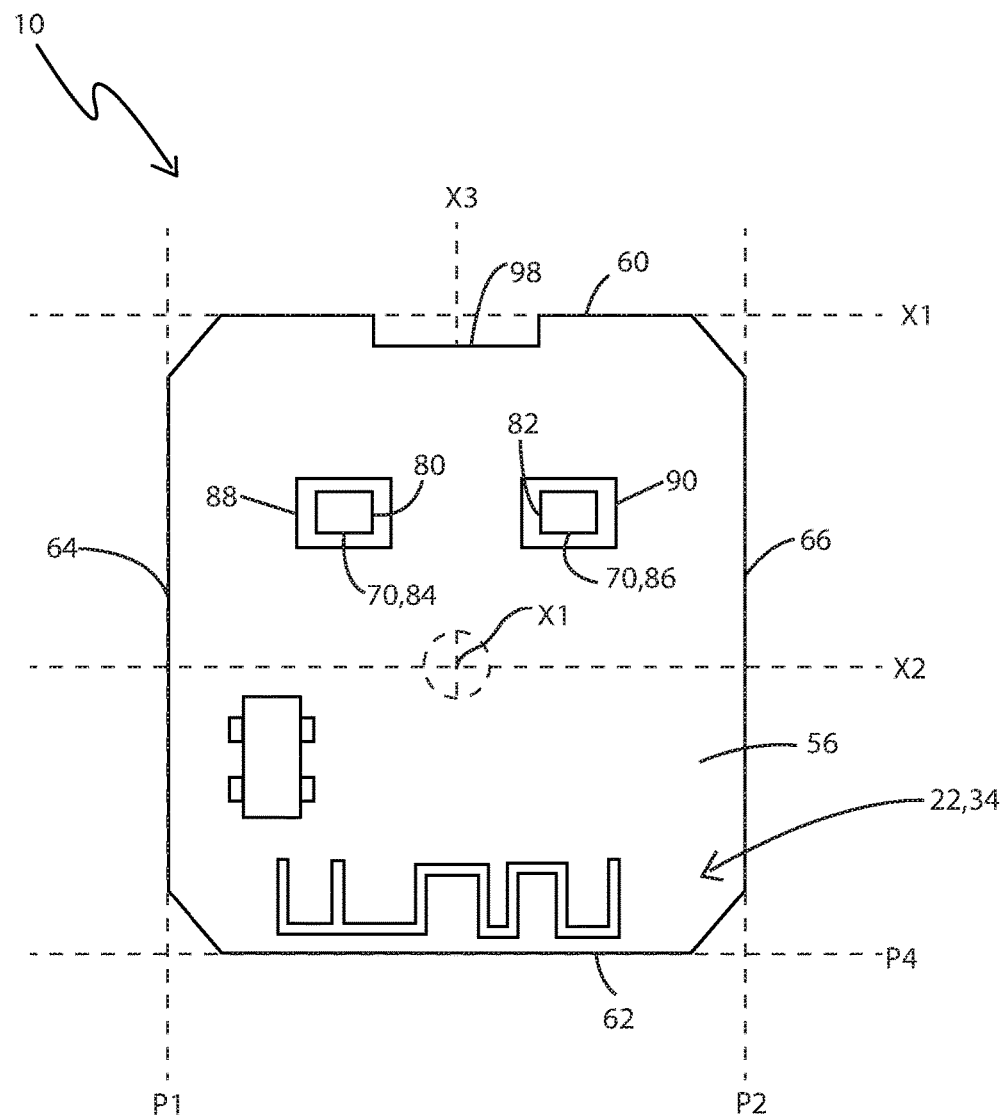
FIG. 6 is a front elevation view of the PCB in accordance with the present disclosure.

As depicted in FIG. 6, and in accordance with the present disclosure, when viewed from the front, the PCB 22 further includes an imaginary vertically extending plane P1 defined by the left edge 64 of the PCB 22 and which is perpendicular to the transverse axis X2. When viewed from the front, the PCB 22 further includes an imaginary vertically extending second plane P2 defined by the right edge 66 of the PCB 22 and which is perpendicular to the transverse axis X2. PCB 22 further includes an imaginary longitudinally extending plane P3 defined by the top edge 60 of the PCB 22 and which is perpendicular to the vertical axis X3. When viewed from the front, the PCB 22 further includes an imaginary longitudinally extending plane P4 defined by the bottom edge 62 of the PCB 22 and which is perpendicular to the vertical axis X3. Planes P1 and P2 are parallel to each other and planes P3 and P4 are parallel to each other. Planes P1 and P2 are orthogonal to planes P3 and P4, i.e., are perpendicular thereto.

As depicted in FIG. 5-FIG. 8, and in accordance with one aspect of the present disclosure, the USB connector 24 is a male USB connector and includes a first end 68, a second end 70, a top surface 72, a bottom surface 74, a left edge 76 and a right edge 78. The USB connector 24 includes an imaginary vertically extending plane P5 (FIG. 8) defined by the first end 68 of the USB connector 24 and which is perpendicular to the longitudinal axis X1. The USB connector 24 further includes an imaginary vertically extending plane P6 (FIG. 8) defined by the second end 70 of the USB connector 24 and which is perpendicular to the longitudinal axis X1. Planes P5 and P6 are parallel to each other. Planes P5 and P6 are orthogonal to planes P3 and P4 of PCB 22, i.e., perpendicular thereto. Furthermore, planes P5 and P6 are orthogonal to planes P1 and P2, i.e., perpendicular thereto.

As depicted in FIG. 5-FIG. 8, and in accordance with the present disclosure, the longitudinal axis X1 is intermediate the plane P1 and the plane P2. The longitudinal axis X1 is intermediate the plane P3 and the plane P4.

As depicted in FIG. 5-FIG. 8, and in accordance with the present disclosure, the transverse axis X2 is intermediate the plane P3 and the plane P4. The transverse axis X2 is intermediate the plane P5 and the plane P6.

As depicted in FIG. 5-FIG. 8, and in accordance with the present disclosure, the vertical axis X3 is intermediate the plane P1 and the plane P2. The vertical axis X3 is intermediate the plane P5 and the plane P6.

As depicted in FIG. 5-FIG. 8, and in one example, the first surface 56 and the second surface 58 of the PCB 22 define a first through hole 80 and a second through hole 82. The first through hole 80 is located above the longitudinal axis X1 and away from the vertical axis X3 towards the right edge 66 of the PCB 22. The second through hole 82 is located above the longitudinal axis X1 and away from the vertical axis X3 towards the left edge 64 of the PCB 22. In one example the first through hole 80 and the second through hole 82 are coplanar.

The USB connector 24 includes a first mounting portion 84 and a second mounting portion 86 located near the second end 70 of the PCB 22. In one example, the first mounting portion 84 and the second mounting portion 86 may be mounting pins. The first mounting portion 84 of the USB connector 24 extends through the first through hole 80 of the PCB 22 and the second mounting portion 86 of the USB connector 24 extends through the second through hole 82 of the PCB 22.

The PCB 22 further includes a first mounting pad 88 and a second mounting pad 90 provided on the first surface 56 of the PCB 22. In one example, the PCB 22 further includes a third mounting pad 92 and a fourth mounting pad 94 mounted on the second surface 58 of the PCB 22. The first mounting portion 84 and the second mounting portion 86 are fixedly secured to the first surface 56 of the PCB 22 in any suitable manner, such as by soldering the first and second mounting portions 84, 86 to the first and second mounting pads 88, 90 respectively. The top surface 72 of the USB connector 24 and the bottom surface 74 of the USB connector 24 are fixedly secured to the second surface 58 of the PCB 22 in any suitable manner, such as by soldering the top surface 72 and the bottom surface 74 of the USB connector 24 to the third and fourth mounting pads 92, 94 respectively.

In one example, and as depicted in FIG. 5-FIG. 8, the USB connector 24 is mounted orthogonally to the first surface 56 and the second surface 58 of the PCB 22. In other words, the longitudinally extending top surface 72 and bottom surface 74 of the USB connector 24 are perpendicular to the vertically extending first surface 56 and second surface 58 of the PCB 22. One of the benefits of mounting the USB connector 24 orthogonally to the first surface 56 and the second surface 58 of the PCB 22 includes, inter alia, allowing the night light 10 to be positioned closer to an external power source, such as a laptop computer, as further described below. Further, in one example, the USB connector is mounted vertically upward from the longitudinal axis X1.

In accordance with one aspect of the present disclosure, and as depicted in FIG. 5-FIG. 8, the PCB 22 further includes four mitered corners 96 positioned between the first surface 56 and the second surface 58 of the PCB 22. The mitered corners 96 are configured to fit within an interior spaced bounded by the rounded corners of the front cover 14, the rear surface 16, the front portion 18 and the middle portion 20 of the night light 10. Although the first surface 56 and the second surface 58 of the PCB 22 are depicted as having mitered corners 96, the corners may be shaped in any suitable manner such as being configured complementary to the rounded corners of the housing 12.

In accordance with one aspect of the disclosure, the top edge 60 of the PCB 22 defines a notch 98 positioned approximately intermediate the left edge 64 and the right edge 66 of the PCB 22 and vertically upward from the longitudinal axis X1. In one example, the notch 98 may be provided to help seat the PCB 22 within the interior cavity of the housing 12.

In one aspect according to the present disclosure, the at least one dimmable light source 28 of the night light 10 includes a first red, green and blue light-emitting diode (RGB LED) 100, a second RGB LED 102, a third RGB LED 104 and a fourth RGB LED 106. The RGB LEDs 100, 102, 104 and 106 utilize an additive color model in which red, green and blue light are added together in various ways to reproduce a broad array of colors. In order to form a color with the RGB LED, three light beams may be superimposed. Examples of additive color mixing includes adding red to green which yields yellow, adding red to blue which yields magenta, adding green to blue which yields cyan and adding all three primary colors (red, green and blue) together yields white. As one of ordinary skill in the art would understand, other suitable light sources or any other colored LEDs, such as white light LEDs may be used as the at least one dimmable light source 28 of the night light 10.

Figure 7:
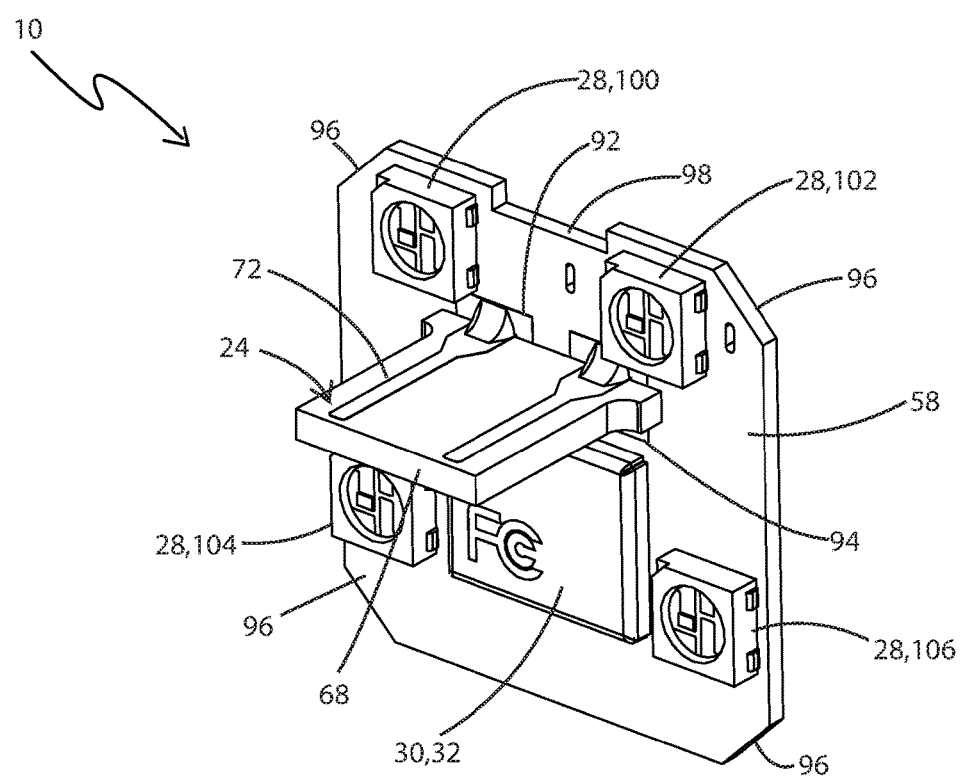
FIG. 7 is a rear elevation view of the PCB in accordance with the present disclosure.
Figure 8:
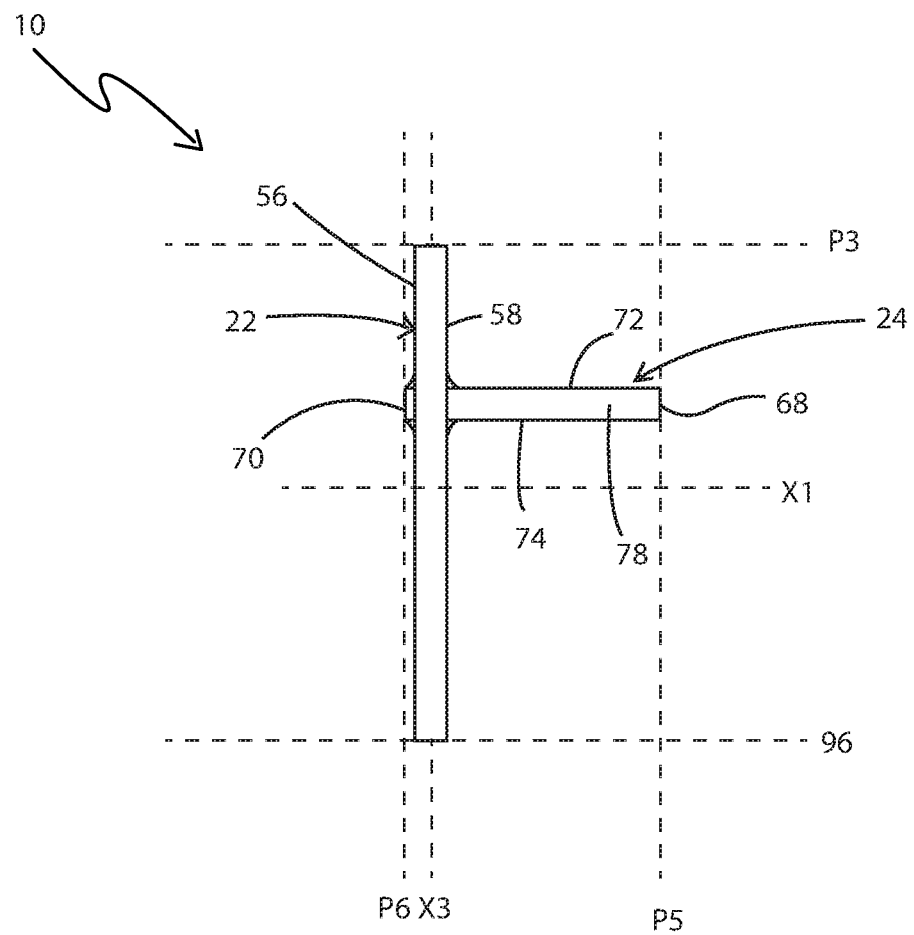
FIG. 8 is a left side elevation view of the PCB in accordance with the present disclosure.
Figure 9:
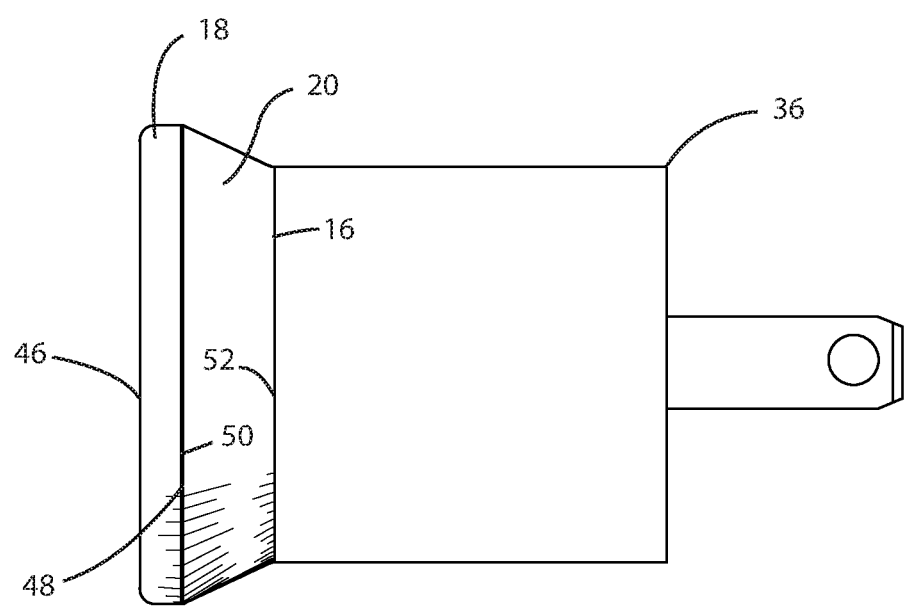
FIG. 9 is right side elevation view of a night light in combination with a power adapted in accordance with the present disclosure.

As depicted in FIG. 7, the first RGB LED 100 is mounted on the second surface 58 of the PCB 22 vertically upward from the longitudinal axis X1 and transversely left from the vertical axis X3. The second RGB LED 102 is mounted on the second surface 58 of the PCB 22 vertically upward from the longitudinal axis X1 and transversely right from the vertical axis X3. The third RGB LED 104 is mounted on the second surface 58 of the PCB 22 vertically downward from the longitudinal axis X1 and transversely left from the vertical axis X3. The fourth RGB LED 106 is mounted on the second surface 58 of the PCB 22 vertically upward from the longitudinal axis X1 and transversely right from the vertical axis X3. Although the first, second, third and fourth RGB LEDs 100, 102, 104, 106 have been described as being mounted in a particular position, the first, second, third and fourth RGB LEDs 100, 102, 104, 106 may be mounted on PCB 22 in any desired position.

In one aspect according to the present disclosure, the wireless data communication module 30 of night light 10 is mounted to the second surface 58 of the PCB 22 in any suitable manner, such as by soldering the wireless data communication module 30 to the second surface 58 of the PCB 22. As depicted in FIG. 7, the wireless data communication module 30 is mounted on the second surface 58 of the PCB 22 vertically downward from the USB connector 24 and approximately intermediate between the third RGB LED 104 and the fourth RGB LED 106. In one example, the antenna 32 of night light 10 is integrated within the wireless data communication module 30; however, a separate antenna 32 may also be utilized as one of ordinary skill in the art would understand. The wireless data communication module 30 and antenna 32 operatively engaged and are configured to communicate with wireless electronic devices, such as a laptop or a smart phone, based on any suitable wireless data communication protocols, including, but not limited to, Bluetooth, ZigBee, WiFi, infrared, WiMax, LTE, ZWave, or other suitable or desired protocols not listed herein. Further, it is envisioned that the wireless data communication module 30 and antenna 32 may be adapted to accommodate changes in current wireless communication standards. Based on the wireless communication, certain functions of the night light 10 may be controlled via the wireless device as further described below.

In accordance with one aspect of the present disclosure, the PCB 22 is mounted within the housing 12 in any suitable manner. In one example, the PCB 22 is received within an interior cavity of the housing 12 and is mounted to an interior surface of the middle portion 20. USB connector 24 of the PCB 22 extends through the USB connector opening 54 and within the USB connector housing 26.

In accordance with one aspect of the present disclosure, the USB connector 24 of the night light 10 may be inserted into any suitable USB receptacle (not shown), including, but not limited to, a USB receptacle of a power adapter 36, a USB receptacle of a computer or portable computer such as a laptop or notebook computer (not shown) and/or a USB receptacle in an automobile (not shown). Therefore, the night light 10 may be powered by receiving direct current (DC) from the USB receptacle when the USB connector 24 inserted into the USB receptacle. In one example, the power adapter 36 may be a conventional AC power adapter which converts AC power input provided by an alternating current power source such as a conventional AC electrical outlet (not shown) into DC current to power the night light 10.

It is also envisioned that the night light 10 may also be powered by a battery source (not shown) such as a lithium iron phosphate (LiFePO4) battery (LFP battery) which is a type of rechargeable battery. (Although not illustrated herein, it will be understood that the battery source may be retained within an accessible compartment provided in the interior cavity of the housing 12.) Other suitable batteries (rechargeable or non-rechargeable) may be used as one of ordinary skill in the art would understand. When the USB connector 24 is inserted into the USB receptacle, direct current (DC) flowing from the USB receptacle may charge the battery within the battery source. In this case, when the night light 10 is removed from the USB receptacle, the night light 10 may be powered by the battery source retained in the housing 12. Therefore, not only can the night light 10 serve as a source of illumination in the particular location where the night light 10 is plugged into a USB receptacle, but the night light 10 may serve as a source of illumination in any desired location when the night light 10 is powered by the battery source for as long as the battery source keeps a sufficient charge. Therefore, in one aspect according to the present disclosure, the night light 10 may be portable and rechargeable.

It is also envisioned that the PCB 22 may include at least one sensor (not shown) mounted on the PCB 22 in any suitable manner. For example, the PCB 22 may include a passive infrared sensor (PIR sensor) which is an electronic sensor that measures infrared (IR) light radiating from objects in its field of view. As one of ordinary skill in the art would understand, other sensors, such as a photodetector may be included in the night light 10 configured to sense ambient light levels. The processor logic 34 provided in night light 10 would then be configured to power on and power off the night light 10 based on the ambient light levels detected by the photodetector. Further, more than one sensor may be provided within the night light 10 to provide any desired functionalities.

As indicated above and in accordance with one aspect of the present disclosure, the PCB 22 includes the processor logic 34. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extend beyond merely gathering data, analyzing the information, and displaying the results.

Figure 10:
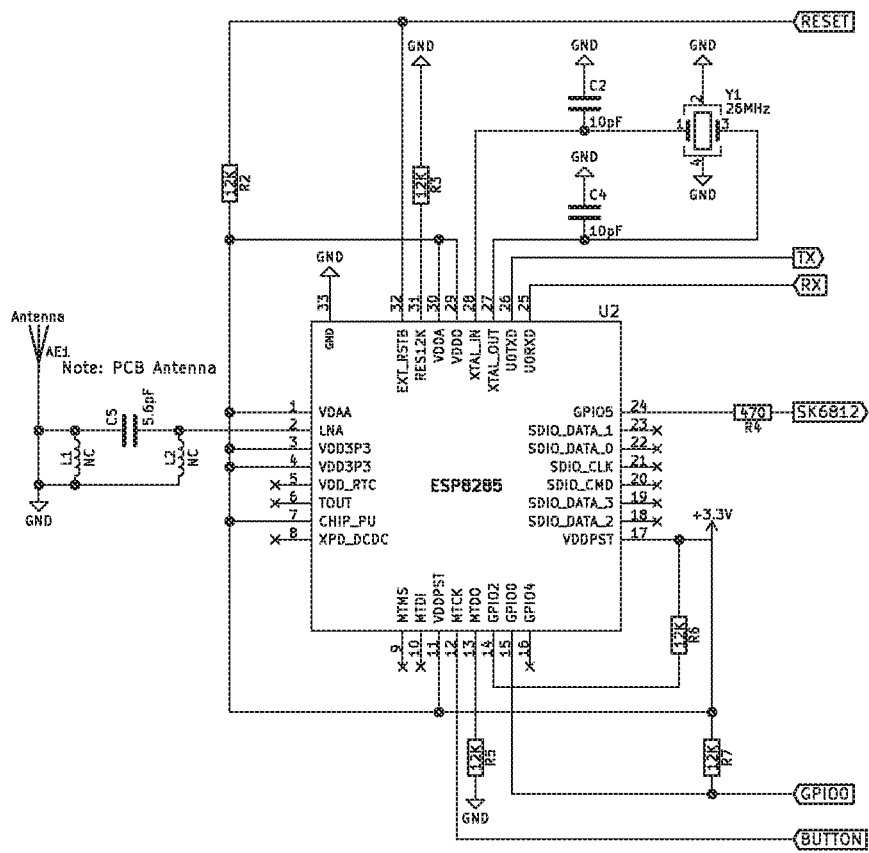
FIG. 10 is an exemplary schematic diagram of the circuitry associated with the processor logic in accordance with the present disclosure.

In accordance with one aspect of the present disclosure, FIG. 10 represents an exemplary schematic diagram of the circuitry associated with the processor logic 34. Further the processor logic 34 of the PCB 22 includes circuitry configured to receive power from the USB receptacle and deliver that power to the various electronic components of the night light 10 including, but not limited to, the at least one dimmable light source 28. In the event the night light 10 includes a battery source, the processor logic 34 of the PCB 22 may further include circuitry configured to receive power from the battery source and deliver that power to the various electronic components of the night light, including, but not limited to, the at least one dimmable light source 28.

The processor logic 34 is further configured to power the night light 10 on and off. The night light 10 may be powered on and off through wireless communication or manually by a user such as by manipulating a power switch. In the event the night light 10 is controlled wirelessly, the processor logic 34 allows a user to control the amount of current flowing in the circuitry powering the at least one dimmable light source 28 which is similar to the function of a rheostat.

The processor logic 34 further includes circuitry configured to control the color of the at least one dimmable light source 28 as further described below. According to one aspect of the present invention, the processor logic 34 is configured to control the four RGB LEDs 100, 102, 104 106 as further described below. The RGB LEDs 100, 102, 104, 106 of the present disclosure are capable of outputting over sixteen million colors. In other words, the RGB LEDs 100, 102, 104, 106 are capable of outputting over sixteen million discrete combinations of red, green and blue based on different hue, saturation and lightness shades.

The processor logic 34 further includes circuitry configured to program and/or control the timing of when the night light 10 is powered on and off as further described below.

The processor logic 34 is further configured to allow the night light 10 to communicate with wireless electronic devices, such as a laptop or a smart phone, based on any suitable wireless data communication protocols, including, but not limited to, Bluetooth, ZigBee, WiFi, infrared, WiMax, LTE, ZWave, or other protocols not listed as further described below. Further, it is envisioned that the processor logic 34 may be adapted to accommodate changes in current wireless communication standards. Based on the wireless communication, certain functions of the processor logic 34 may be controlled via the wireless device.

In operation, the night light 10 may be operated manually or through wireless communication. When the night light 10 is operated manually, a user inserts the USB connector 24 into a USB receptacle such as a USB receptacle of a power adapter 36. The USB receptacle provides DC current to the PCB 22 which powers the various electronic components, including, but not limited to, the at least one dimmable light source 28. The at least one dimmable light source 28 is turned on and off and dimmed or brightened by a user making selections from a wireless device. In one example, the RGB LEDs 100, 102, 104 and 106 may be individually controlled. In other words, and in one example, a user may control each RGB LED 100, 102, 104 and 106 to emit different colors of light, at different intensities and for different periods of time, amongst other configurations. For example, the RGB LEDs 100, 102, 104 106 may be programmed to emit light in a sequence with different colors of light being emitted from each RGB LED 100, 102, 104 and 106. It is further envisioned that the night light 10 may serve as a notification mechanism or device as further described below.

Figure 11:
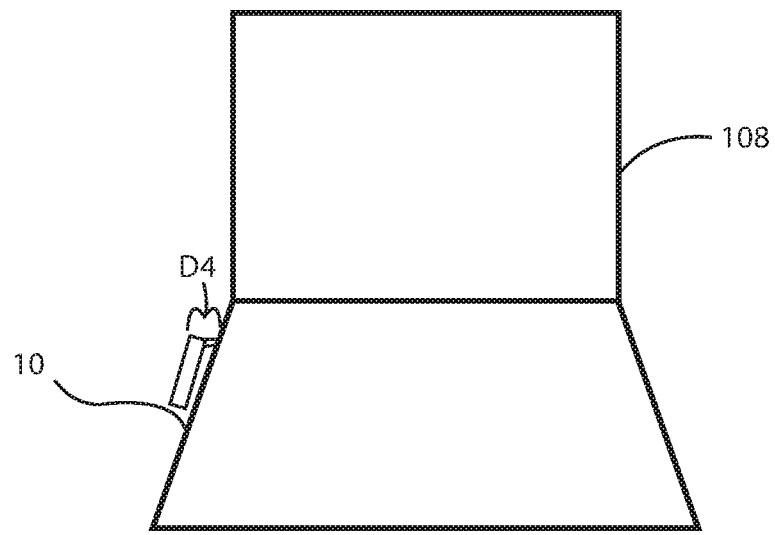
FIG. 11 is an operational view showing the night light plugged into a USB-receptacle of a laptop computer.
Figure 12:
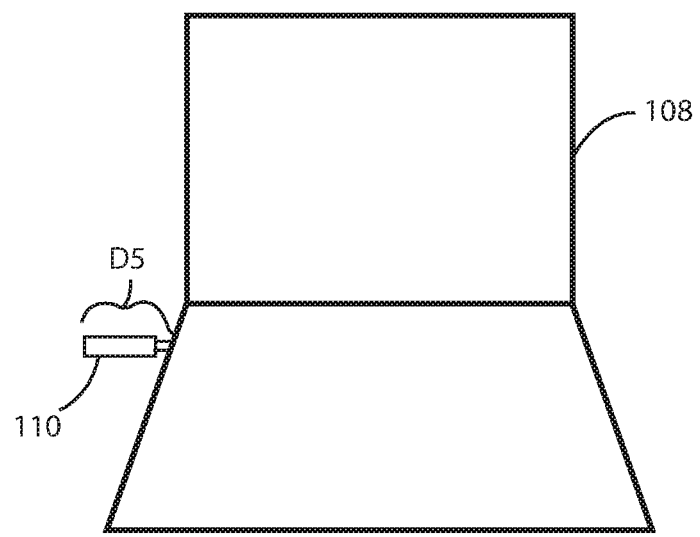
FIG. 12 is an operational view showing a PRIOR ART USB-powered device plugged into the USB-receptacle of a laptop computer.

As stated above, one of the benefits of mounting the USB connector 24 orthogonally to the first surface 56 and the second surface 58 of the PCB 22 includes, inter alia, allowing the night light 10 to be positioned closer to an external power source, such as the power adapter 36 or a laptop computer 108, when compared to a PRIOR ART USB-powered device 110. FIG. 11 depicts the night light 10 plugged into the USB-receptacle of the laptop computer 108. The night light 10 extends outwardly from the USB-receptacle a distance D4. FIG. 12 depicts a PRIOR ART USB-powered device 110 plugged into the USB-receptacle of the laptop computer 108. The PRIOR ART USB-powered device 110 extends outwardly from the USB-receptacle a distance D5. The distance D5 is greater than the distance D4, and, thus, the night light 10 is positioned closer to the external power source than the PRIOR ART USB-powered device 110.

Example methods may be better appreciated with reference to flow charts. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described.

Moreover, less than all the illustrated blocks may be required to implement an example methodology. Blocks may be combined or separated into multiple components. Furthermore, additional and/or alternative methodologies can employ additional, not illustrated blocks.

Figure 13:
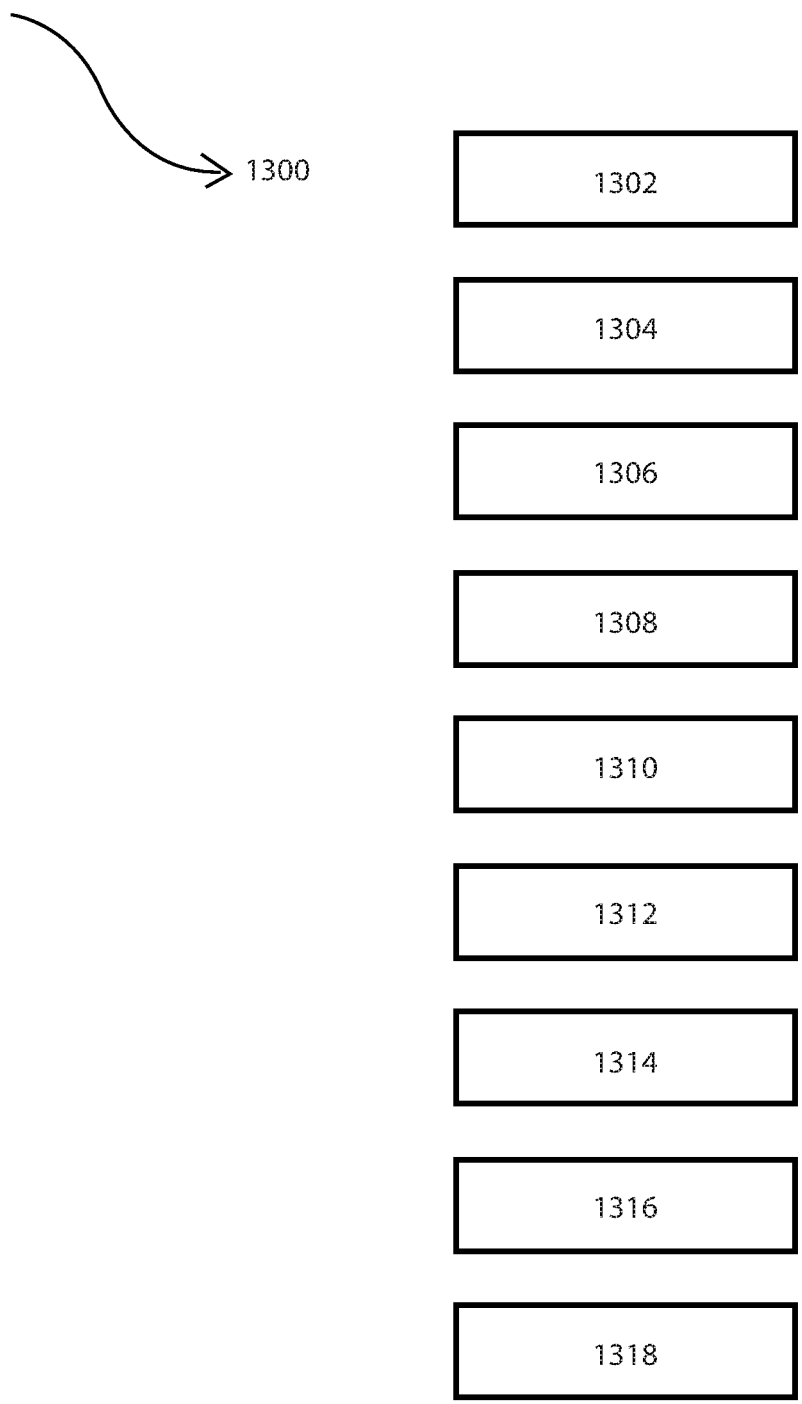
FIG. 13 is a flow chart depicting an exemplary method of wirelessly controlling the USB-powered utility tool in accordance with the present disclosure.

FIG. 13 illustrates an example method 1300 of wirelessly controlling the processor logic 34 to control and program the night light 10. For example, and not meant as a limitation, a user may utilize a smart phone and an application to control the processor logic 34. With reference to FIG. 11, a user may download and install an application for the night light 10 onto a smart phone, which is shown generally at 1302. The user then opens the application and a splash screen, which is an introduction page to the application displaying a desired logo, appears while the application is loading, which is shown generally at 1304. After the application has completed the loading step, the user is brought to a main page where the smart phone scans for available wireless devices and provides a list of available wireless devices which includes the night light 10, which is shown generally at 1306.

The user then pairs or links the smart phone to the night light 10 to allow wireless communication between the smart phone and the night light 10, which is shown generally at 1308. Once the night light 10 is properly paired, the screen displays various options selectable by the user, such as a light intensity slider option, a color selection option, a timer option, a motion activation option and a notification option which is shown generally at 1310. It is envisioned that other options may be provided within the application as one of ordinary skill in the art would understand.

If the user selects the color selection option, the user can utilize an online RGB color wheel, which is an abstract illustrative organization of color hues around a circle, which shows the relationships between primary colors, secondary colors, tertiary colors etc., to select a desired color of the at least one dimmable light source 28, or the user can choose a color of the at least one dimmable light source 28 based on pre-set options, which is shown generally at 1312.

If the user selects the timer option, the user has the option of utilizing the light intensity slider to dim or brighten the at least one dimmable light source 28, select a new color and set a timer for the night light 10 to power on and/or off at certain times of the day, which is shown generally at 1314. For example, and not meant as a limitation, the timer can be set to automatically turn on at 7:00 PM and automatically turn off at 7:00 AM, or at any other desirable times.

If the user selects the motion activation option, the user has the option of utilizing the light intensity slider to dim or brighten the at least one dimmable light source 28, select a new color, and select an option for the night light 10 to automatically power on for a specific amount of time based on the at least one sensor detecting movement, which is shown generally at 1316. For example, and not meant as a limitation, the user can set the night light 10 to power on when the at least one sensor detects movement of an object and stay on for 5 seconds, 10 seconds, 30 seconds, 60 seconds, 5 minutes or indefinitely. It is envisioned that the application can be configured to allow different time periods of activation as one of ordinary skill in the art would understand.

If the user selects the notification option, the user has the option of utilizing the at least one dimmable light source 28 to serve as a notification mechanism to notify the user of various occurrences. In one example, if the user has an email application downloaded, the user may configure the at least one dimmable light source 28 to turn on in a specific way, such as by turning the at least one dimmable light source 28 on for a specific period of time with a specific color every time an email is received by the smartphone, which is shown generally at 1318. In another example, if the user desires to be reminded of an important occurrence, such as a specific time to take a medication, the user may configure the at least one dimmable light source 28 to turn on in a specific way, such as by turning the at least one dimmable light source 28 on for a specific period of time with a specific color at the time that the user needs to take the medication.

Although utility tool 10 has been depicted and described as being a night light, it is envisioned that the utility tool 10 may be any desired utility tool, including, but not limited to, smoke detectors, motion detectors and the like.

While USB connector 24 has been described herein as a male USB connector, it will be understood that in other instances, USB connector 24 may be a female USB connector.

Although the USB connector 24 is depicted in the figures as being mounted orthogonally to the first surface 56 and the second surface 58 of the PCB 22, it is understood that the USB connector 24 may, alternatively, be mounted in any suitable orientation relative to any component of the PCB 22, such as being mounted at an angle other than 90 degrees relative to the first surface 56 and/or the second surface 58 of the PCB 22.

Although night light 10 has been indicated as manually operable through a computing device or wirelessly operable through a remote computing device, it will be understood that night light 10 may be provided with a physical switch that is located on the housing 12 and which can be controlled by a user physically depressing or contacting the same to switch night light on or off.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the disclosure is not limited to the exact details shown or described.

The invention claimed:

1. A universal serial bus (USB)-powered utility tool comprising:
   a housing defining an interior space;
   at least one dimmable light source positioned on one side of the housing;
   a USB connector extending outwardly from the housing;
   a printed circuit board (PCB) positioned orthogonal to the USB connector; and
   a processor logic configured to control a current being supplied to the at least one dimmable light source.

2. The USB-powered utility tool of claim 1, wherein the USB connector is positioned on another side of the housing.

3. The USB-powered utility tool of claim 1, wherein the USB connector is positioned orthogonal to the at least one dimmable light source.

4. The USB-powered utility tool of claim 1, further comprising:
   a first surface of the PCB spaced apart from a second surface of the PCB defining a longitudinal direction therebetween; wherein the USB connector is operationally engaged with the PCB; and wherein the USB connector is mounted on the PCB orthogonal to the first surface of the PCB.

5. The USB-powered utility tool of claim 4, further comprising:
   a through hole of the PCB extending through the first and second surface of the PCB.

6. The USB-powered utility tool of claim 5, further comprising:
   a mounting portion of the USB connector extending through the through hole and fixedly connected to the first surface of the PCB.

7. The USB-powered utility tool of claim 4, further comprising:
   a central longitudinal axis extending between the first surface of the PCB and the second surface of the PCB; wherein the USB connector is positioned vertically upward from the central longitudinal axis.

8. The USB-powered utility tool of claim 1, further comprising:
   a top edge of the PCB and a bottom edge of the PCB defining a vertical direction therebetween;
   a central vertical axis extending between the top edge of the PCB and the bottom edge of the PCB; wherein the USB connector is positioned intermediate the central vertical axis.

9. The USB-powered utility tool of claim 1, wherein the PCB and the processor logic are configured to communicate wirelessly.

10. The USB-powered utility tool of claim 1, wherein the wireless communication is adapted to be controlled by a user to control at least one of: an intensity of the at least one dimmable light source, a color of the at least one dimmable light source, an illumination timer for the at least one dimmable light source, a motion activator of the at least one dimmable light source and a notification mechanism for the at least one dimmable light source.

11. The USB-powered utility tool of claim 1, wherein the at least one dimmable light source includes at least two light emitting diodes (LEDs) individually controllable by the processor logic.

12. The USB-powered utility tool of claim 1, further comprising:
   a front cover of the housing;
   a rear surface of the housing;
   a USB connector opening defined by the rear surface; and
   a USB connector housing extending outwardly from the rear surface and in operable communication with the USB connector opening; wherein the PCB is mounted within the interior space of the housing.

13. The USB-powered utility tool of claim 12, wherein the USB connector extends through the USB connector opening and is at least partially enclosed by the USB connector housing.

14. The USB-powered utility tool of claim 12, wherein the front cover is translucent and the at least one dimmable light source is positioned to emit light through the front cover.

15. The USB-powered utility tool of claim 12, further comprising:
   a front portion of the housing; and
   a middle portion of the housing; wherein the front portion and the middle portion are translucent and the at least one dimmable light source is positioned to emit light through the front portion and the middle portion.

16. The USB-powered utility tool of claim 1, wherein the at least one dimmable light source includes at least one light-emitting diode (LED).

17. The USB-powered utility tool of claim 16, wherein the at least one LED is a red, green and blue light-emitting diode (RGB LED).

18. The USB-powered utility tool of claim 1, wherein the USB connector is a male USB connector adapted for electrically connecting to a USB receptacle to provide power to the utility tool.

19. A universal serial bus (USB)-powered utility tool comprising:
   a housing defining an interior space;
   at least one dimmable light source positioned on one side of the housing;
   a USB connector extending outwardly from the housing;
   a printed circuit board (PCB) having a first surface spaced apart from a second surface defining a longitudinal direction therebetween; the PCB positioned orthogonal to the USB connector; and
   a central longitudinal axis extending between the first surface of the PCB and the second surface of the PCB; wherein the USB connector is positioned vertically upward from the central longitudinal axis.

20. The USB-powered utility tool of claim 19, wherein the USB connector is positioned on another side of the housing.

* * * * *